Aug. 27, 1935.  A. V. DEMMITT  2,012,867
INCUBATOR
Filed Nov. 14, 1932   6 Sheets-Sheet 1

Albert V. Demmitt
INVENTOR
BY Victor J. Evans &Co.
ATTORNEY

Aug. 27, 1935.  A. V. DEMMITT  2,012,867
INCUBATOR
Filed Nov. 14, 1932  6 Sheets-Sheet 2
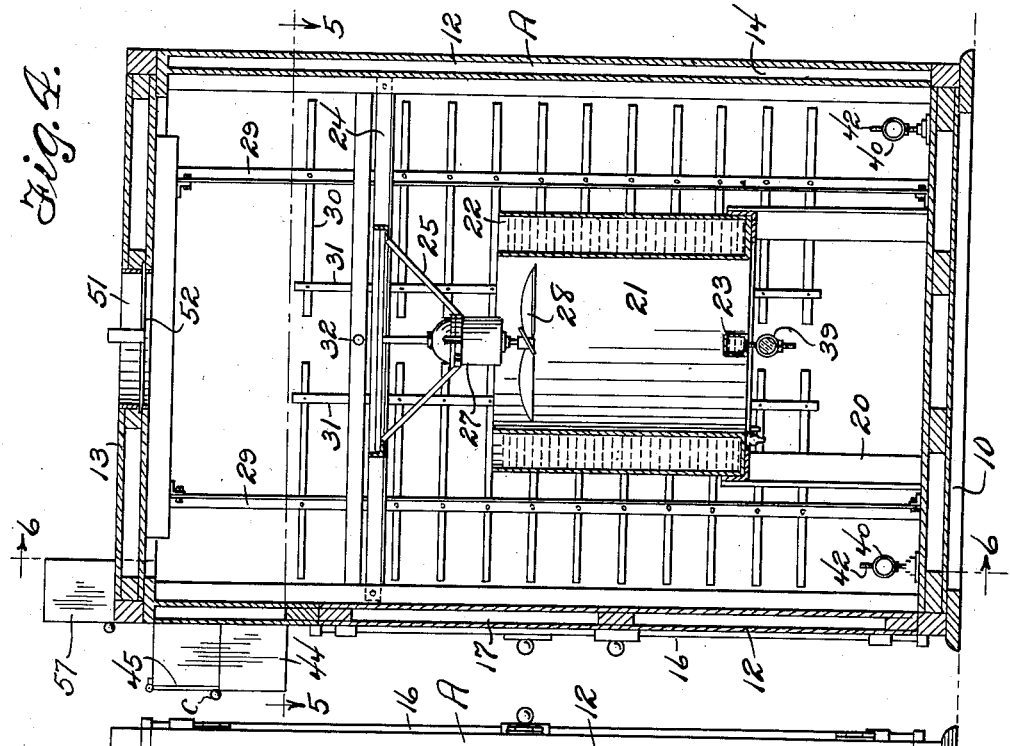
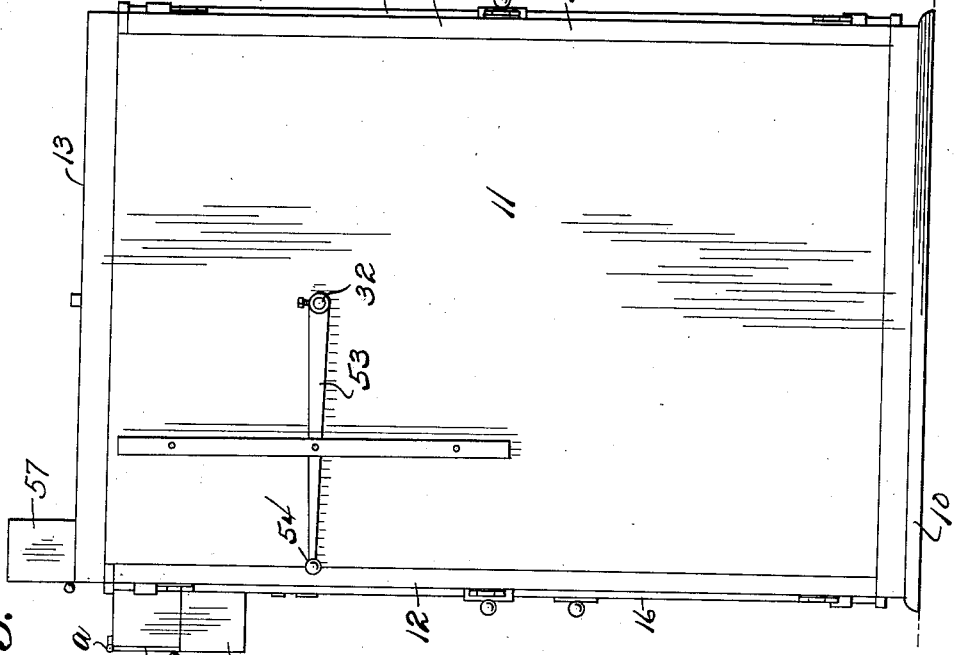
Albert V. Demmitt
INVENTOR
BY Victor J. Evans & Co.
ATTORNEY

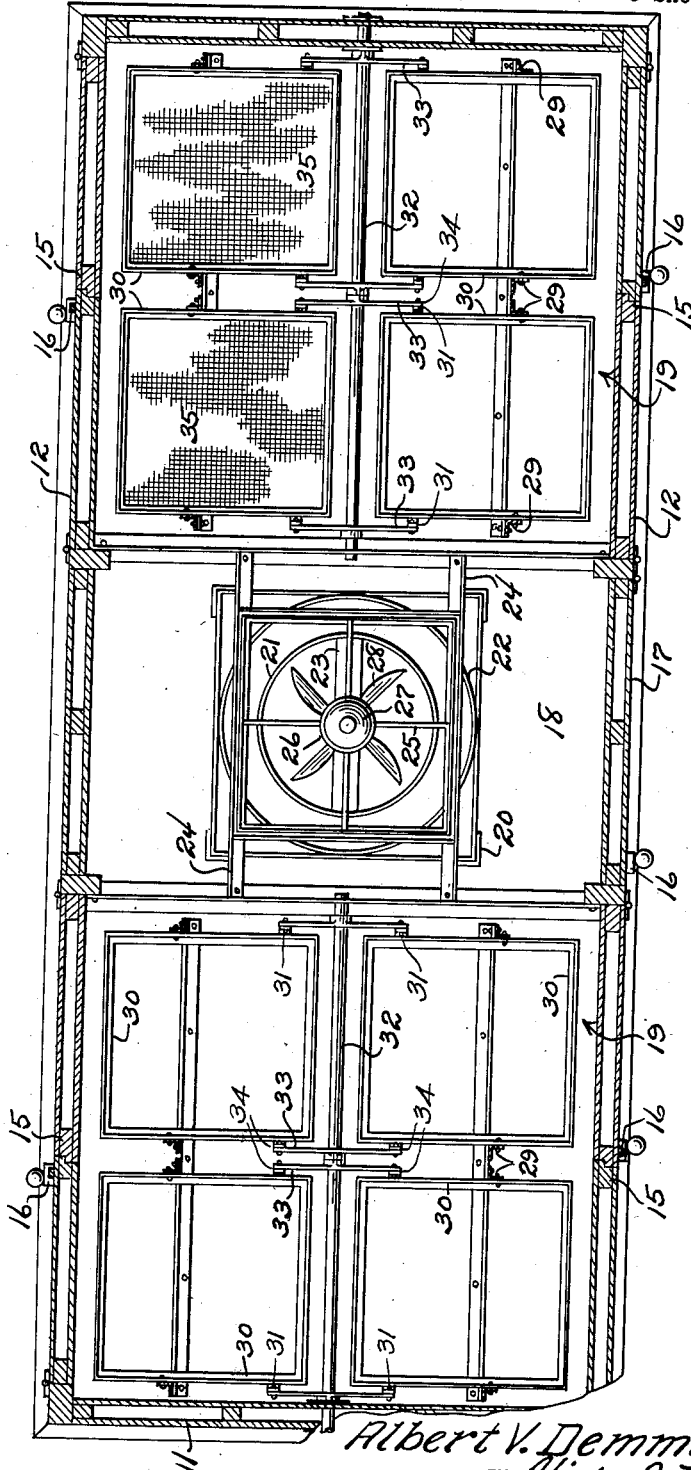

Aug. 27, 1935.   A. V. DEMMITT   2,012,867
INCUBATOR
Filed Nov. 14, 1932   6 Sheets-Sheet 4

Albert V. Demmitt INVENTOR
BY Victor J. Evans & Co.
ATTORNEY

Aug. 27, 1935. A. V. DEMMITT 2,012,867
INCUBATOR
Filed Nov. 14, 1932 6 Sheets-Sheet 5
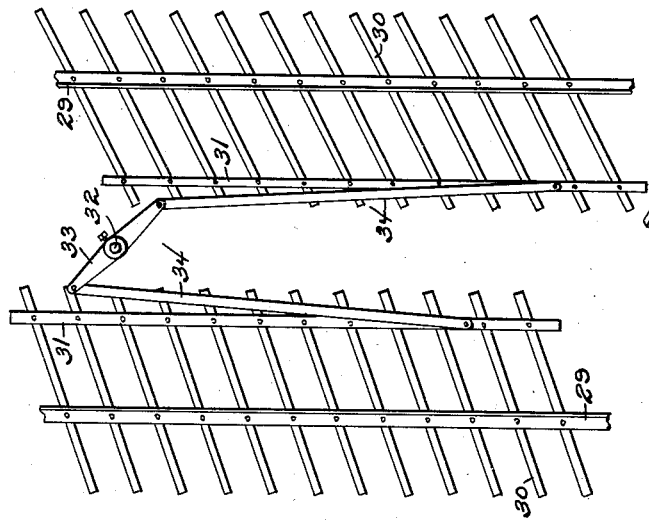
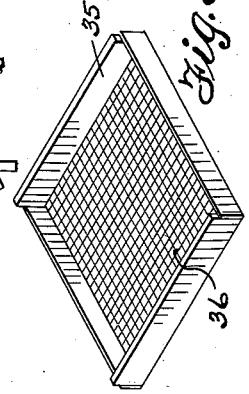
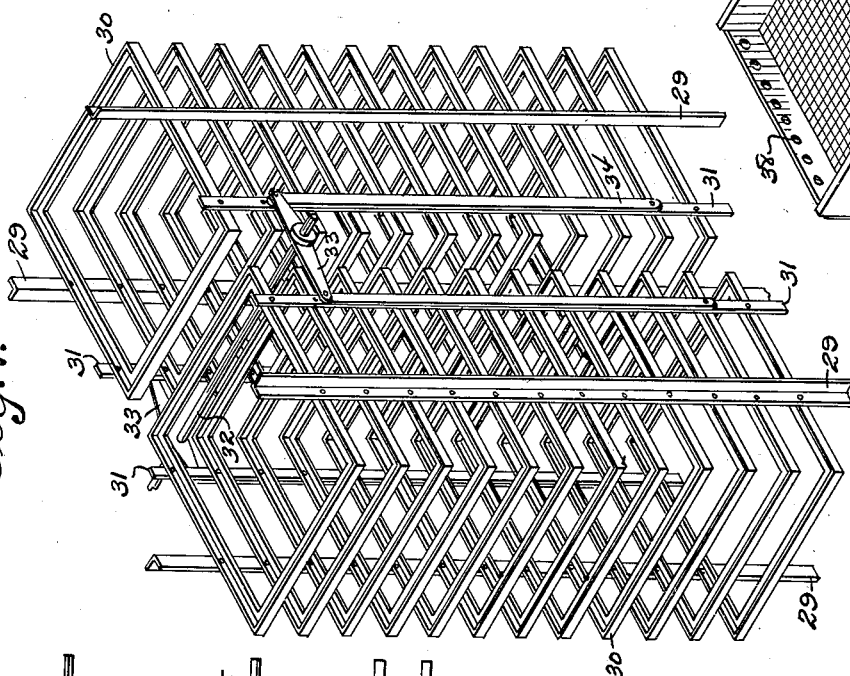
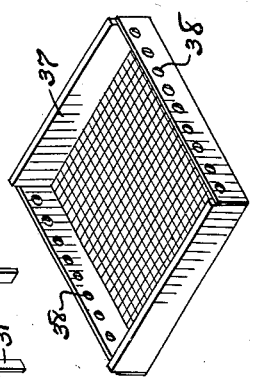
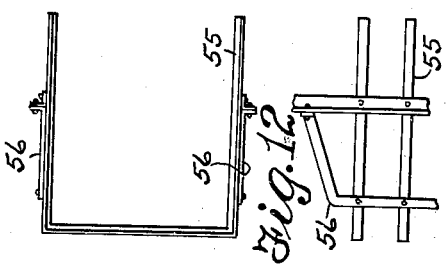
Albert V. Demmitt
INVENTOR
BY Victor J. Evans & Co.
ATTORNEY

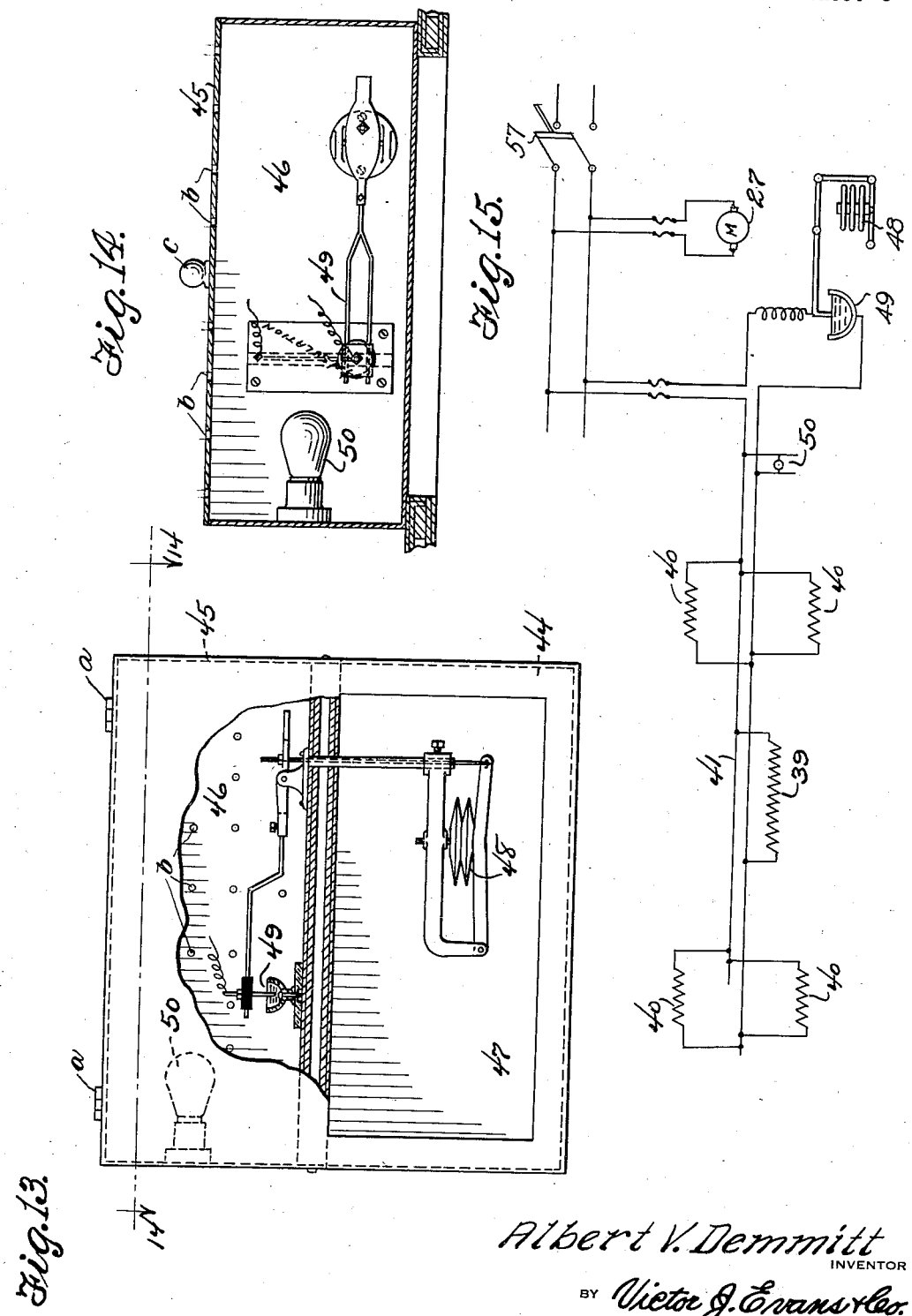

Patented Aug. 27, 1935

2,012,867

UNITED STATES PATENT OFFICE 2,012,867

INCUBATOR

Albert V. Demmitt, New Carlisle, Ohio

Application November 14, 1932, Serial No. 642,632

1 Claim. (Cl. 119—37)

The invention relates to an incubator and has for its primary object to provide a structure of this character, wherein vapor is produced from water about a circulating tube interiorly thereof and such vapor is devoid of a fixed or determined circulation and in this fashion the interior of the structure is heated and the temperature maintained uniformly throughout the interior thereof, the action of the circulation of the vapor being necessary to embryo development within the eggs as placed within the incubator.

Another object of the invention is the provision of an incubator of this character, wherein the temperature interiorly thereof is automatically controlled, while eggs to be hatched are held within trays, these being supported in racks susceptible of adjustment from without the body of the incubator, while located within is a water container and a heater. The heater is susceptible of adjustment to vary the temperature and in the working thereof a vaporous atmosphere is created within the said incubator while the top of the latter is provided with a ventilator, this being likewise adjustable.

A further object of the invention is the provision of an incubator of this character, wherein the construction thereof is novel in form and is of a character to enable egg hatching to be carried forth as an industrial enterprise, there being a certain path for air to travel and a forced draft interiorly of the incubator while a vaporous atmosphere is present therein and the temperature of such atmosphere is automatically controlled.

A still further object of the invention is the provision of an incubator of this character which is comparatively simple in construction, thoroughly reliable and efficient in its working, readily and easily accessible, assuring embryo development within the eggs stored therein for the hatching of the same, strong, durable, and inexpensive to manufacture.

In the accompanying drawings:

Figure 3 is an end elevation.

Figure 4 is a sectional view on the line 4—4 of Figure 1 looking in the direction of the arrows.

Figure 5 is a sectional view on the line 5—5 of Figure 4 looking in the direction of the arrows.

Figure 7 is a perspective view of the egg tray stacks.

Figure 8 is an elevation thereof showing the stacks adjusted.

Figure 9 is a perspective view of one of the egg trays.

Figure 10 is a perspective view of a slight modification of tray.

Figure 11 is a top plan view of a modified form of stack.

Figure 12 is a fragmentary side elevation thereof.

Figure 13 is an elevation partly broken away looking from the inside of the body outwardly showing in detail the thermostat and the switch controlled thereby.

Figure 14 is a sectional view on the line 14—14 of Figure 13.

Figure 15 is a diagrammatic plan view of the electric circuit employed in the incubator.

Figure 1:
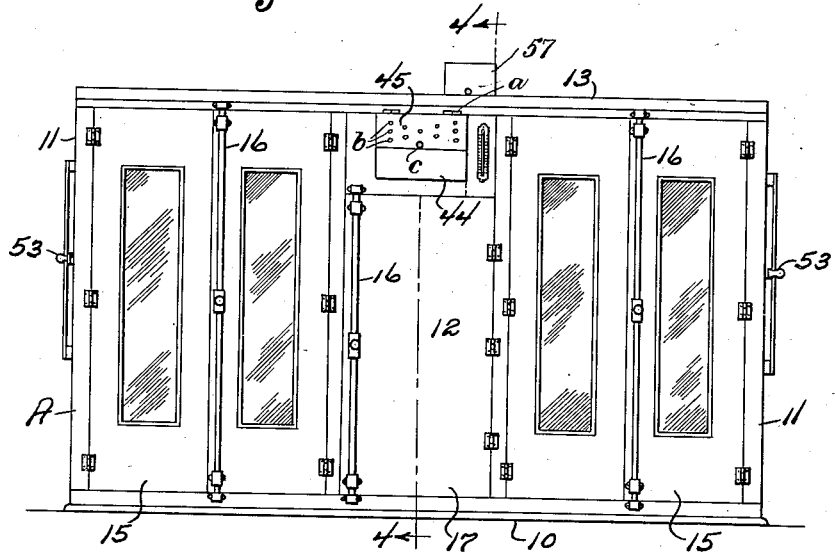
Figure 1 is a front elevation of an incubator constructed in accordance with the invention.
Figure 2:
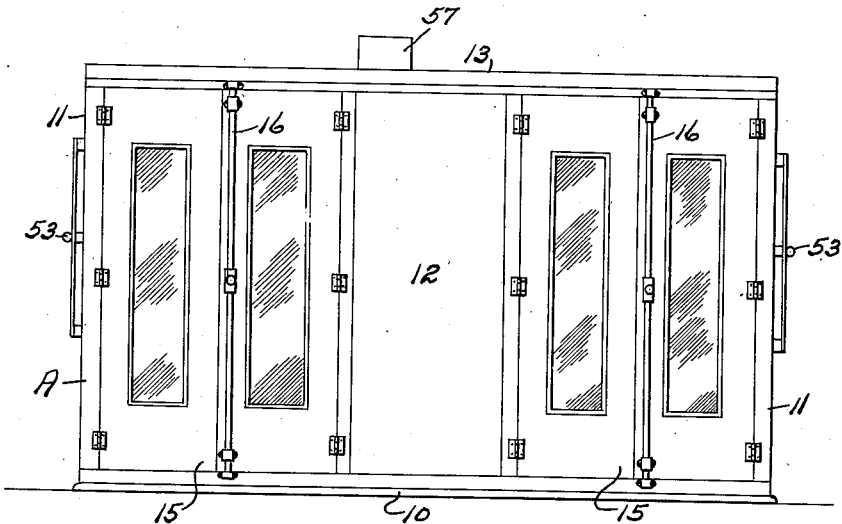
Figure 2 is a rear elevation thereof.
Figure 6:
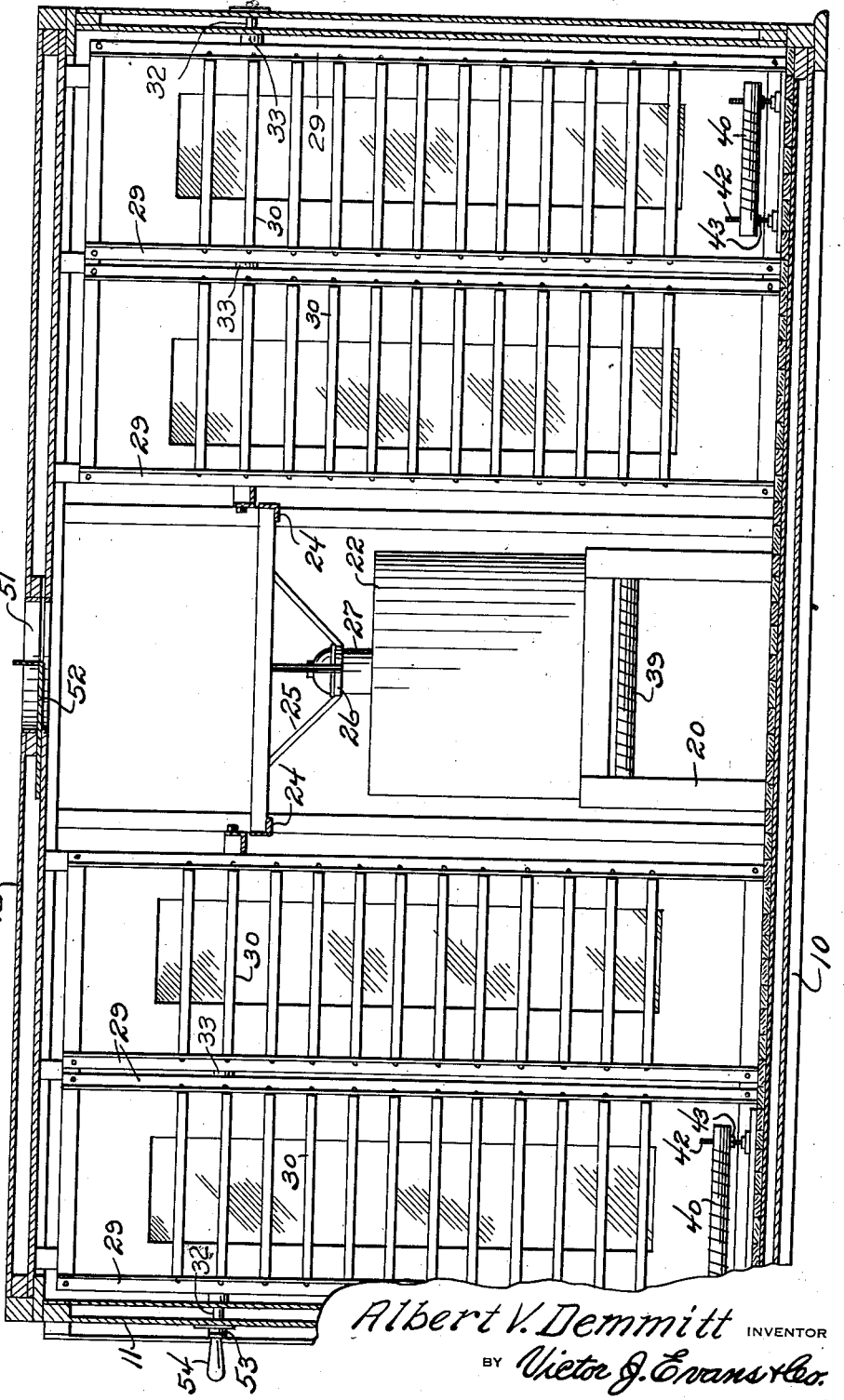
Figure 6 is a sectional view on the line 6—6 of Figure 4 looking in the direction of the arrows.

Referring to the drawings in detail the incubator constituting the present invention, in its organization, comprises a body A including a base or bottom 10, ends 11, sides 12 and a top 13 respectively, these being preferably double walled at 14, while in the sides 12 are formed suitable doorways closed by double hinged doors 15 adapted to be latched by sliding lock bolts 16 of any approved type. The doorways are preferably on opposite sides of the transverse median of the body A and spaced from each other, while at one side is a swinging door 17 permitting access to an intermediate compartment 18 interiorly of the body. The doors 15 permit access to the stack spaces 19 on opposite sides of the said compartment 18.

Arranged interiorly of the compartment 18 is a stand or rest 20 supporting a vertically disposed circulating tube or cylinder 21 elevated the required distance from the base or bottom 10. This tube or cylinder 21 is surrounded by a water tank or container 22, the lower portion of which has as a part thereof a cross circulating pipe or conduit 23 which bridges the tube or cylinder 21 as is shown in Figure 4 of the drawings.

Above this tank or container 22 and supported upon suitable transversely disposed ledges 24 is a suspension frame 25 having the hanger 26 for the motor 27 of an electric fan 28, the latter being disposed partly extended within the tube or cylinder 21 and in the operation exerting a down trend of circulation through the said tube or cylinder.

Located within the spaces 19 are pairs of double stacks, each including upright supports 29 having pivoted thereto and located therebetween superposed suitably spaced rack frames 30, these in each stack being pivoted to a tie rod or bar 31, while journaled transversely between the pairs of stacks in each space 19 is a horizontally disposed rocking shaft 32 having fixed thereto rocking cranks 33, these having pivoted thereto shift bars 34 which are pivoted to the tie rods or bars 31 so that on the shifting of the cranks 33 the rack frames 30 will become tilted from a level or horizontal plane as is clearly illustrated in Figure 8 of the drawings.

Removably fitted within each rack frame is an egg tray 35, the same having a reticulated or foraminous bottom 36 to assure free circulation therethrough.

In Figure 10 of the drawings there is shown a slight modification of an egg tray 37, the opposite side walls of which carry apertures or openings 38, otherwise such tray 37 is alike to the tray 35.

Located beneath the tank 22 and also beneath the double racks within the body A are electric heating elements 39 and 40 respectively, these being arranged in an electric circuit 41 tapped into a main circuit having the motor 27 of the fan 28.

Each heating element 40 is adjustably carried upon supporting screws 42 having threaded thereon the nuts 43 which, when adjusted, regulate the position of the heating element, either raised or lowered, as will be obvious.

Located upon one side 12 of the body A near its top is a box-like housing 44 having hinged at a the upper front cover section 45 provided with light openings b and this housing has arranged therein superposed chambers 46 and 47 respectively, the latter containing the thermostat 48 which operates a switch 49 in the circuit 41 for opening and closing the same. The cover section 45 carries a suitable hand knob c. The chamber 46 carries an electric lamp 50 which is also included in the circuit 41. The upper compartment is closed by the door and when opened the adjusting screw can be tightened or loosened as this works on the arm beneath the thermostat. When it is loosened it keeps the current on the heating elements longer as this leaves the contact pin in the mercury. When it is tightened it makes the contact pin come out of the mercury quicker and cuts the current off. The door opens outwardly and there is no heat in the upper chamber. The lamp 50 is only lighted when the contact pin drops into the mercury in the bowl. In other words, the adjusting nut is set to bring the temperature in the incubator up to approximately 100 degrees and when it reaches this the thermostat lifts the contact pin out of the mercury and the current is shut off. When the current is shut off the light goes out as it is on the same circuit with the thermostat. The lamp is merely a signal to indicate at a glance whether the current is on or off. The chamber 46 containing the thermostat 48 has no opening to the outside and the same fits up against the machine, it being open to the inside of the incubator, this leaving the same temperature and atmosphere therein so it will get all around the thermostat, whereby the latter can expand and contract as the temperature changes within the incubator. The thermostat is filled with ether and will expand or contract at the slightest change of temperature.

The electric heating element 39 functions to vaporize the water within the tank 22 while the fan 28 circulates this vapor through the tube 21, the vapor circulation having no fixed or definite path or course, while the heating elements 40 maintain the atmosphere of vapor at a definite temperature, whereby uniformity of temperature will be maintained throughout the compartment 18 and spaces 19 within the body A.

Formed in the top 13 of the body A centrally with respect to the compartment 19 is a ventilating opening 51 having a gate or slide 52 adjustable to vary the extent of such opening or for the closing of the same, the gate or slide 52 being manually operable.

Fixed to the outer ends of the rocking shafts 32, which protrude exteriorly of the body A at the ends thereof, are hand levers 53, each having a handle 54 at its free end. These levers 53 when operated will adjust the double stacks in unison with each other to the degree as is shown in Figures 7 and 8 of the drawings.

In Figures 11 and 12 there is shown a slight modification of stack, wherein the tray racks 55 are maintained stationary through the truss bars 56 and such frames 55 are rigidly sustained in a level or in a horizontal plane in the stack.

The uprights 29 of the stacks are made fast to the bottom and top 10 and 13 of the body A of the incubator as is clearly shown in Figure 4 of the drawings. At the top of the body A is conveniently located a cut-out switch and fuse housing 57, the switch and fuses being included in the electric system.

What is claimed is:

An incubator of the kind described, comprising a body having a plurality of compartments arranged side by side therein and in communication with each other, a vertical tube open at opposite ends in the intermediate compartment and being of a length and disposed therein to be spaced a considerable distance from the top and bottom of said compartment for free circulation above, below and around said tube, a water jacket concentrically about the tube, of a length corresponding thereto and open at its top, a water conduit crosswise of the tube at its bottom and having opposite ends opening into the jacket, an electric fan suspended above said tube and having a fan blade arranged within the uppermost open end of said tube, an electric heating element bridging the lowermost open end of said tube and immediately beneath and parallel with the conduit, and electric heating elements located in the other compartments at the lowermost portions thereof.

ALBERT V. DEMMITT.